US007084401B2

(12) United States Patent
Bell et al.

(10) Patent No.: US 7,084,401 B2

(45) Date of Patent: Aug. 1, 2006

(54) HIGH SENSITIVITY PARTICLE DETECTION

(75) Inventors: Kenneth Frazer Bell, Wilson, NC (US); Justin Gilmore, Staines (GB)

(73) Assignee: Kidde IP Holdings Limited, Colnbrook Slough (GB)

( * ) Notice: Subject to any disclaimer, the term of this patent is extended or adjusted under 35 U.S.C. 154(b) by 302 days.

(21) Appl. No.: 10/432,739

(22) PCT Filed: Sep. 17, 2002

(86) PCT No.: PCT/GB02/04230

§ 371 (c)(1), (2), (4) Date: Nov. 24, 2003

(87) PCT Pub. No.: WO03/027979

PCT Pub. Date: Apr. 3, 2003

(65) Prior Publication Data

US 2004/0075056 A1 Apr. 22, 2004

(30) Foreign Application Priority Data

Sep. 25, 2001 (GB) ................................ 0123038.2

(51) Int. Cl.
*G01N 21/53* (2006.01)

(52) U.S. Cl. .................................................. 250/341.1

(58) Field of Classification Search ............. 250/341.1; 356/337

See application file for complete search history.

(56) References Cited

U.S. PATENT DOCUMENTS 3,666,864 A 5/1972 Terrell (Continued)

FOREIGN PATENT DOCUMENTS

EP 0 562 756 A1 9/1993

(Continued)

OTHER PUBLICATIONS

Goodman D.S.: "Method for Localizing Light-Scattered Particles" IBM Technical Disclosure Bulletin, IBM Corp. New York, US, vol. 27, No. 5, Oct. 1, 1984, p. 3164 XP002066860 ISN: 0018-8689.

(Continued)

*Primary Examiner*—Constantine Hannaher

(74) *Attorney, Agent, or Firm*—Merchant & Gould P.C.

(57) ABSTRACT

A smoke detector is shown in which blue light is directed through a scattering volume (9) from a radiation emitter (3) and infra-red radiation is also directed through the scattering volume (9) from an infra-red source (3A). Radiation forward-scattered by any particles in the scattering volume (9) is directed by a mirror (13) onto a photodiode (15) which produces an output to control means (16). The emitters (3,3A) are pulsed at different frequencies, enabling the control means (16) to produce separate signals (21,23) corresponding respectively to the scattered blue light and the scattered infra-red radiation. For smoke particles, significantly more blue light is scattered than infra-red radiation, but this is not so much the case for non-smoke particles. A comparator (25) takes the ratio of the two signals (21,23) to produce a smoke-dependent warning output. In order to reduce power consumption and increase the life of the blue light emitter (3), the apparatus normally operates in a monitoring mode in which the infra-red emitter (3A) is pulsed intensively but at a low flashing rate, and the blue light emitter (3) is maintained inoperative, until infra-red radiation scattered by particles in the volume (9) cause the photodiode (15) to produce a sufficient output, whereupon the blue light emitter (3) is rendered operative.

40 Claims, 8 Drawing Sheets

U.S. PATENT DOCUMENTS

| | | | | |
|---|---|---|---|---|
| 3,897,502 | A | 7/1975 | Russell et al. | |
| 3,922,656 | A | 11/1975 | Horvath et al. | |
| 4,237,452 | A | 12/1980 | Malinowski | |
| 4,647,785 | A | 3/1987 | Morita | |
| 5,141,654 | A | 8/1992 | Fernandez | |
| 5,381,130 | A | 1/1995 | Thuillard et al. | |
| 5,759,430 | A | 6/1998 | Tapscott et al. | |
| 5,799,735 | A | 9/1998 | Sundholm | |
| 5,887,662 | A | 3/1999 | Sundholm | |
| 6,011,478 | A | 1/2000 | Suzuki et al. | |
| 6,377,345 | B1 * | 4/2002 | Powell | 356/336 |
| 2002/0118116 | A1 * | 8/2002 | Tice et al. | 340/632 |

FOREIGN PATENT DOCUMENTS

| | | | |
|---|---|---|---|
| GB | 1051841 | | 12/1966 |
| GB | 1 306 734 | | 2/1973 |
| GB | 2 265 309 | A | 9/1993 |
| GB | 2 267 963 | A | 12/1993 |
| GB | 2 330 410 | A | 4/1999 |
| GB | 2 330 420 | A | 4/1999 |
| GB | 2 370 766 | A | 7/2002 |
| GB | 2 370 768 | A | 7/2002 |
| WO | WO 95/28204 | A1 | 10/1995 |
| WO | WO 98/09686 | A2 | 3/1998 |
| WO | WO 99/19852 | A1 | 4/1999 |
| WO | WO 99/38599 | A1 | 8/1999 |
| WO | WO 01/05468 | A2 | 1/2001 |

OTHER PUBLICATIONS

"Practical preparation of potentially anesthetic fluorinated ethyl methyl ethers by means of bromine trifluoride and other methods", Hudlicky et al., Journal of Fluoride Chemistry 102 (2000) 363-367, xp-002215665.

* cited by examiner

HIGH SENSITIVITY PARTICLE DETECTION

TECHNICAL FIELD

The invention relates generally to high sensitivity particle detection. Embodiments of the invention to be described in more detail, by way of example only, are for detecting the presence of smoke particles.

BACKGROUND ART

GB-A-2330410 discloses a smoke detector with alternate activation of the blue and infra-red radiation emitters. Signals representative of received blue and infra-red radiation are compared to determine the presence of smoke.

DISCLOSURE OF INVENTION

According to the invention, there is provided particle detecting apparatus, comprising first and second radiation emitting means for respectively emitting first and second radiation along substantially the same predetermined path into a scattering volume when respectively rendered operative, radiation sensing means for receiving and sensing said first radiation forward-scattered from the scattering volume by the presence of particles therein and for receiving and sensing said second radiation forward-scattered from the scattering volume by the presence of particles therein, processing means responsive to the received and sensed first radiation to produce a first signal in dependence thereon and responsive to the received and sensed second radiation to produce a second signal in dependence thereon, output means for comparing the two signals whereby to produce a warning output when the comparison indicates that the particles are of a predetermined type but not when the comparison indicates otherwise, and characterised by control means operative when the first radiation emitting means is rendered operative to maintain the second radiation emitting means inoperative until the first signal has exceeded a predetermined value and for then rendering the second radiation emitting means operative.

According to the invention, there is also provided a particle detecting method, comprising the steps of controllably allowing the respective emissions of first and second radiation along substantially the same predetermined path into a scattering volume, receiving and sensing said first radiation forward-scattered from the scattering volume by the presence of particles therein and receiving and sensing said second radiation forward-scattered from the scattering volume by the presence of particles therein, processing the received and sensed first radiation to produce a first signal in dependence thereon, processing the received and sensed second radiation to produce a second signal in dependence thereon, comparing the two signals whereby to produce a warning output when the comparison indicates that the particles are of a predetermined type but not when the comparison indicates otherwise, and characterised by, while the first radiation is allowed to be emitted, preventing emission of the second radiation until the first signal has exceeded a predetermined value and for then allowing emission of the second radiation.

BRIEF DESCRIPTION OF DRAWINGS

High sensitivity particle detection apparatus and methods according to the invention will now be described, by way of example only, with reference to the accompanying diagrammatic drawings in which.

MODE OF CARRYING OUT THE INVENTION

Figure 1:
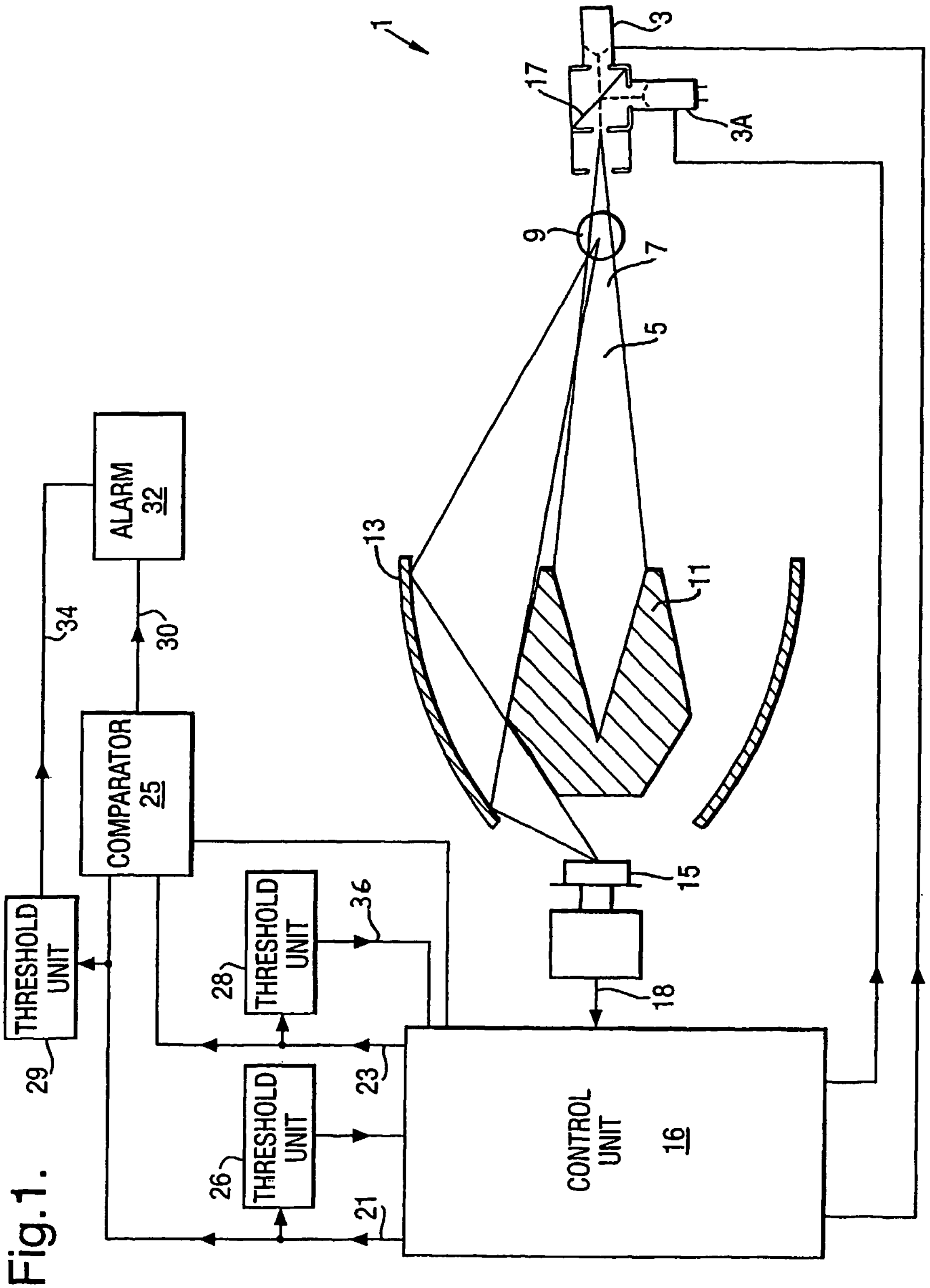
FIG. 1 is a schematic diagram of one form of the apparatus.

The apparatus and methods to be described are for detecting smoke in air using radiation scattering techniques, although it will be appreciated that other particles can be detected using the same apparatus and methods. The apparatus and methods aim to detect the presence of smoke particles at smoke densities at least as low as 0.2% per metre. The primary use of such apparatus is for detecting incipient fires.

The apparatus 1 (FIG. 1) comprises two radiation sources 3,3A which emit radiation which is passed via a beam splitter 17 along a path 5 as shown at 7. Radiation 7 passes through a volume 9 towards a beam dump 11. An elipsoidal mirror 13 is positioned for collecting radiation scattered by the presence of smoke particles in the volume 9 (within a predetermined range of forward scattering angles to be discussed below) and focussing such radiation onto a detector 15 which may be a silicon photodiode.

Source 3 emits radiation at relatively short wavelengths between about 400 nm ($1.6\times10^{-5}$ in.) and 500 nm ($2.0\times10^{-5}$ in.), that is, blue visible light. Preferably, the radiation source 3 is an LED producing radiation at 470 nm ($1.9\times10^{-5}$ in.). Source 3A produces infra-red radiation at about 880 nm ($3.5\times10^{-5}$ in.) and may also be an LED. The detector 15 is sensitive to the radiation emitted by both sources.

In use, the presence of particles in the scattering volume 9 causes the radiation 7 to be scattered through a predetermined range of angles. The elipsoidal mirror 13 is positioned such that any light scattered at forward scattering angles of less than 45°, and more particularly at scattering angles between about 10° and 35°, will be collected by the mirror 13. The mirror 13 focusses the light scattered at these angles from the scattering volume in all planes perpendicular to the incident radiation direction onto the silicon photodiode 15 which will produce a corresponding signal. This arrangement maximises the radiation incident on the photodiode 15.

Any radiation which is not scattered will be incident on and be trapped substantially by the beam dump 11 and no corresponding signal will be produced by the silicon photodiode 15.

The output from the silicon photodiode 15 is fed to a control system 16 on a line 18. Control system 16 controls the energisation of the LEDs 3 and 3A. In a manner to be explained, the control system 16 processes the output received from the photodiode 15 and produces signals on lines 21 and 23 which respectively correspond to the output produced by the photodiode 15 in response to scattered radiation originating from the LED 3 and to the output produced by the photodiode 15 in response to the scattered radiation originating from the LED 3A.

Lines 21 and 23 are fed to a comparator 25 and also to threshold units 26, 28 and 29.

Figure 2:
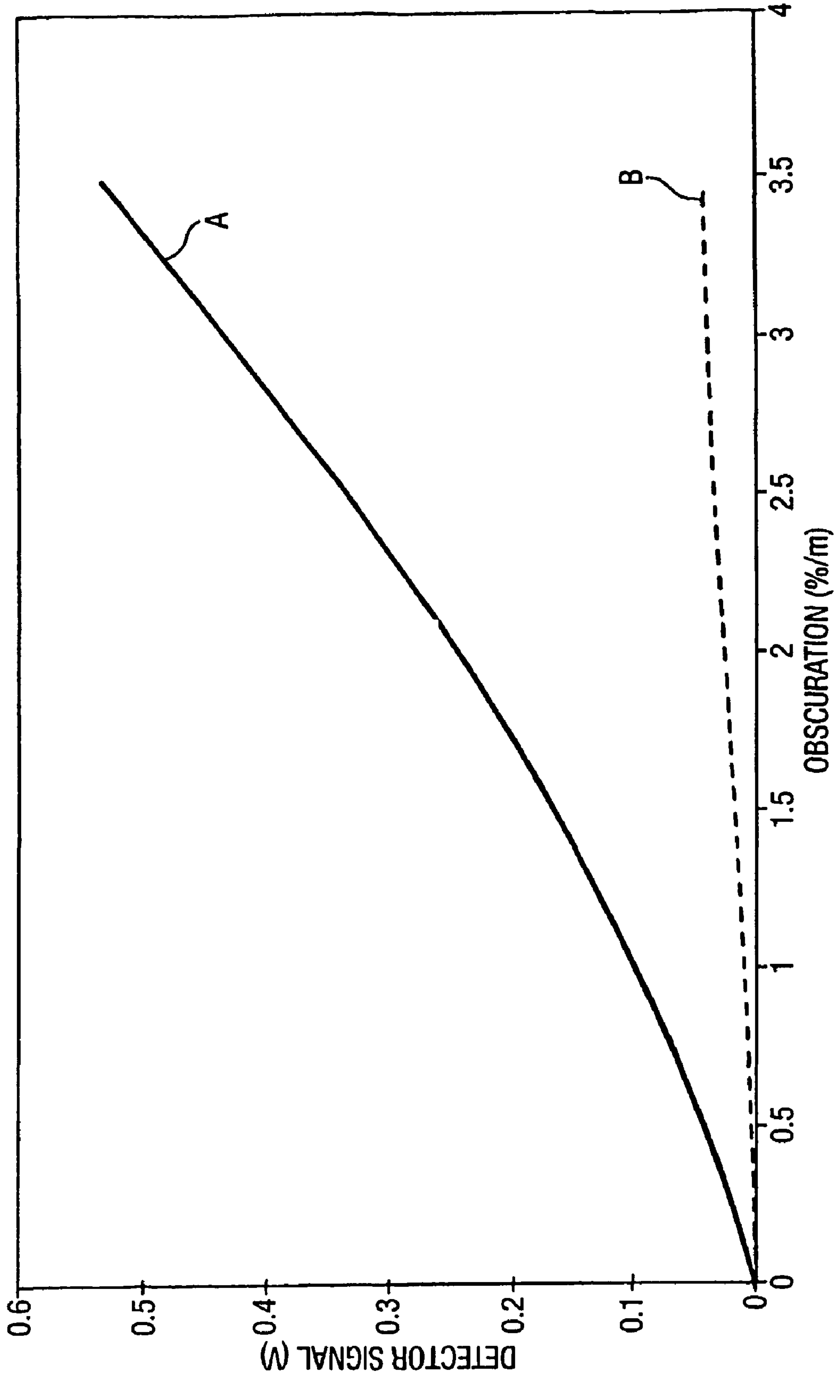
FIGS. 2–7 are graphs for explaining the operation and advantages of the apparatus of FIG. 1.

Curve A in FIG. 2 shows the output of the detector 15 for different degrees of smoke obscuration expressed as a percentage of blue light (that is, light from the source 3) obscured per metre. Curve B shows the corresponding detector output at the same scattering angle but when the radiation is of the order of 880 nm ($3.5\times10^{-5}$ in.)(that is, the radiation from the source 3A). In each case, the range of forward scattering angles is the same (between about 100 and 350). The smoke for the tests illustrated was produced by smouldering cotton.

FIG. 2 clearly shows a significantly greater detector output in response to the blue visible light from source 3 as compared with the detector output produced in response to the infra-red radiation from source 3A detectable signals can be produced from the photodiode 15 at smoke densities as low as 0.2% per metre.

Figure 3:
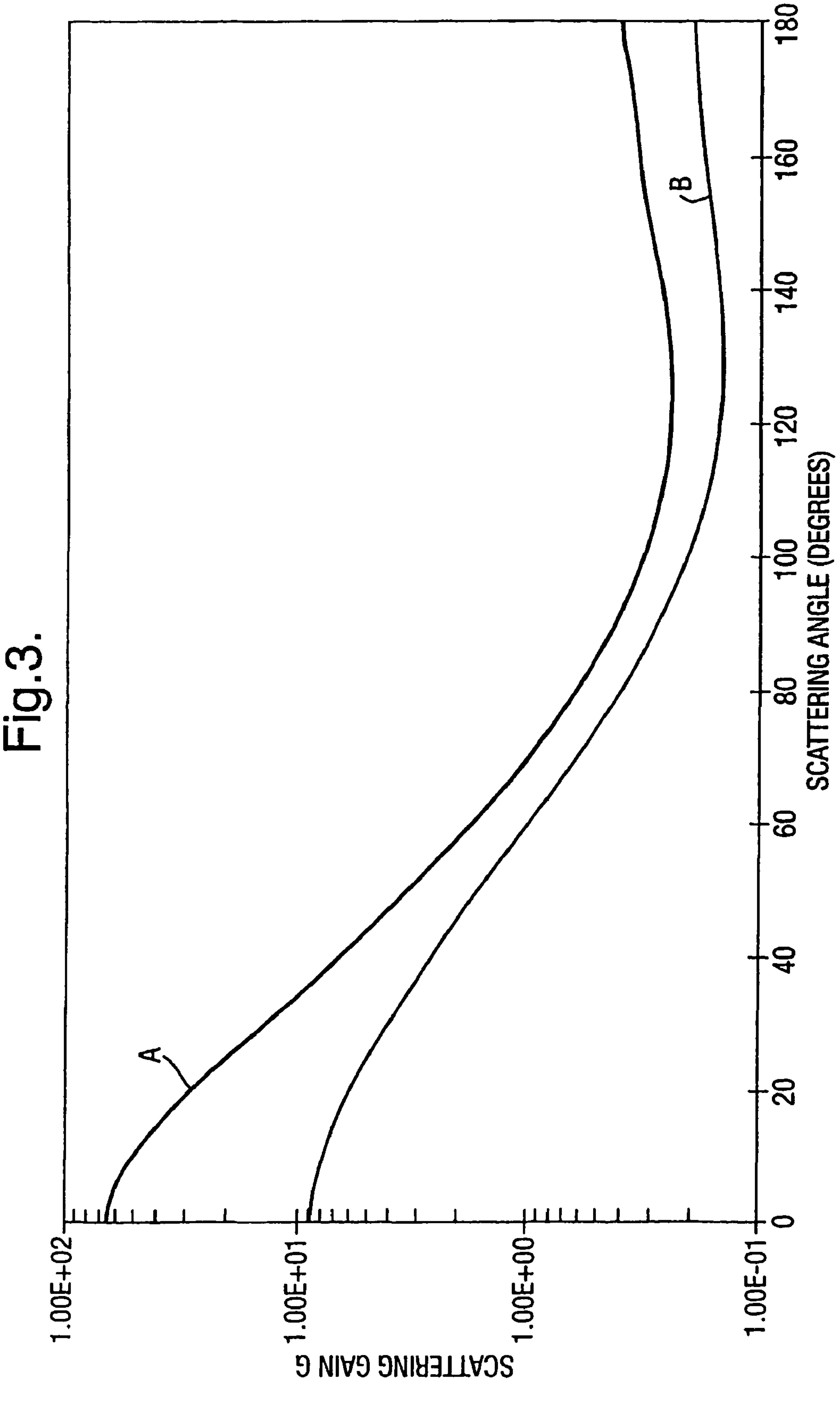

FIG. 3 plots the calculated scattering gain for a particle size distribution typical of smoke against the forward scattering angle using light at different wavelengths. Scattering gain is the amount of light scattered into a unit solid angle as a fraction of the light falling on an individual particle. Curve A corresponds to the blue visible light produced by source 3 and curve B to the infra-red radiation produced by source 3A. FIG. 3 shows how the scattering gain in response to the blue visible light (curve A) is significantly greater than the scattering gain in response to the infra-red radiation (curve B) for scattering angles up to about 155°, although the increase in scattering gain is much more pronounced at scattering angles less than 45°.

Curves A in FIGS. 2 and 3 therefore show how the combination of the use of blue visible light (radiation between 400 and 500 nm $1.6–2.0\times10^{31\ 5}$ in.) and the use of low scattering angles (between about 10° and 35°) produces a significant increase in sensitivity.

Figure 4:
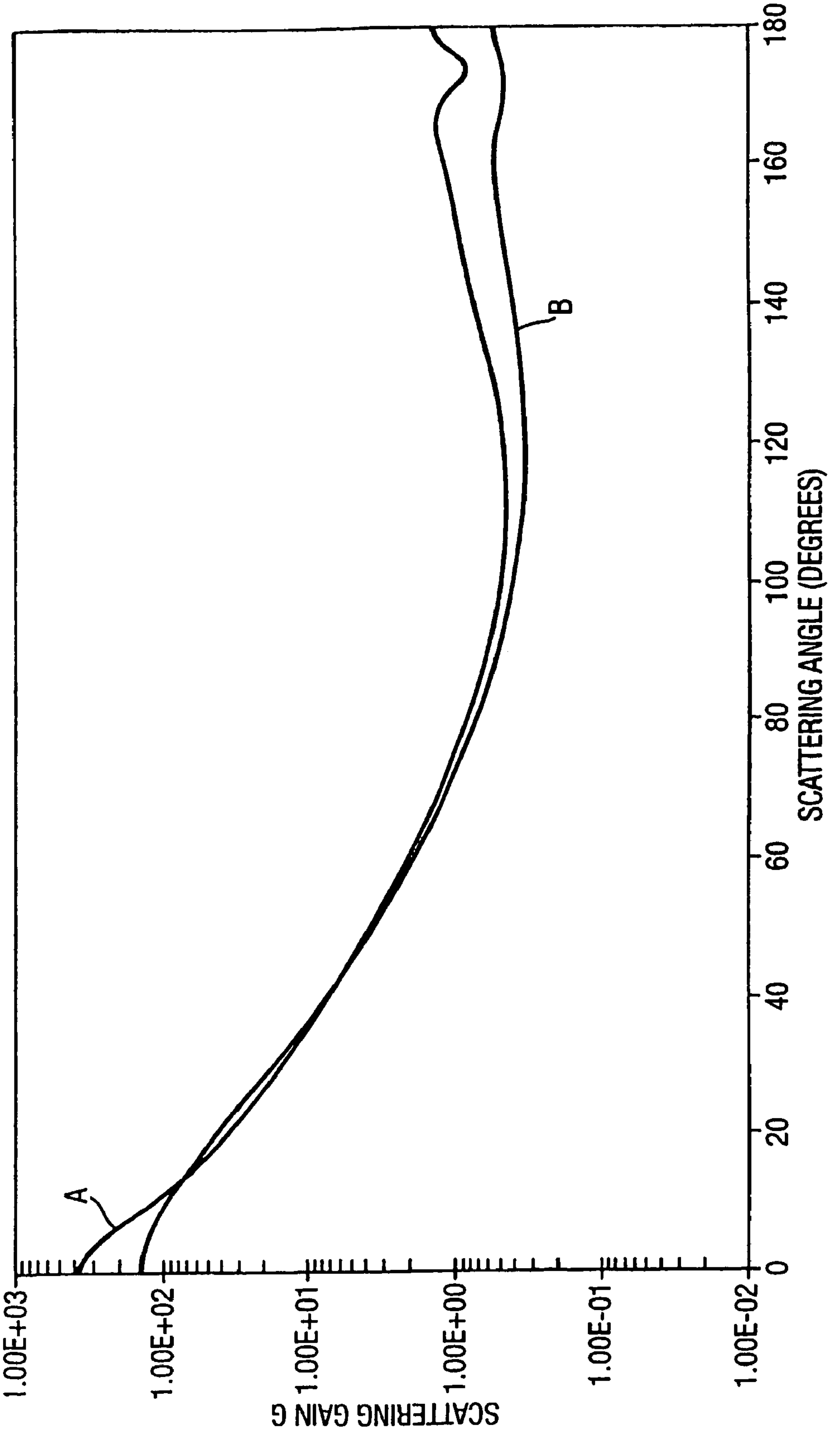

Smoke detectors may be susceptible to false alarms in the presence of larger aerosol particles such as condensed water mist or dust. FIG. 4 corresponds to FIG. 3 except that the particles used are particles having a size distribution typical of condensed water mist. Curve A shows the scattering gain in response to the blue visible light from source 3 and curve B shows the scattering gain in response to the infra-red radiation from source 3A. Curves A and B in FIG. 4 show that the scattering gain is substantially the same at both the wavelengths tested, at least for scattering angles between about 15° and 30°. A comparison of FIGS. 3 and 4 therefore shows that the ratio of the photodiode signals in response to the blue light to the photodiode signals in response to the infra-red radiation is higher for the smoke particles than for "nuisance" aerosols, such as water mist particles.

In use, the detecting apparatus can operate in either of two modes.

Figure 5:
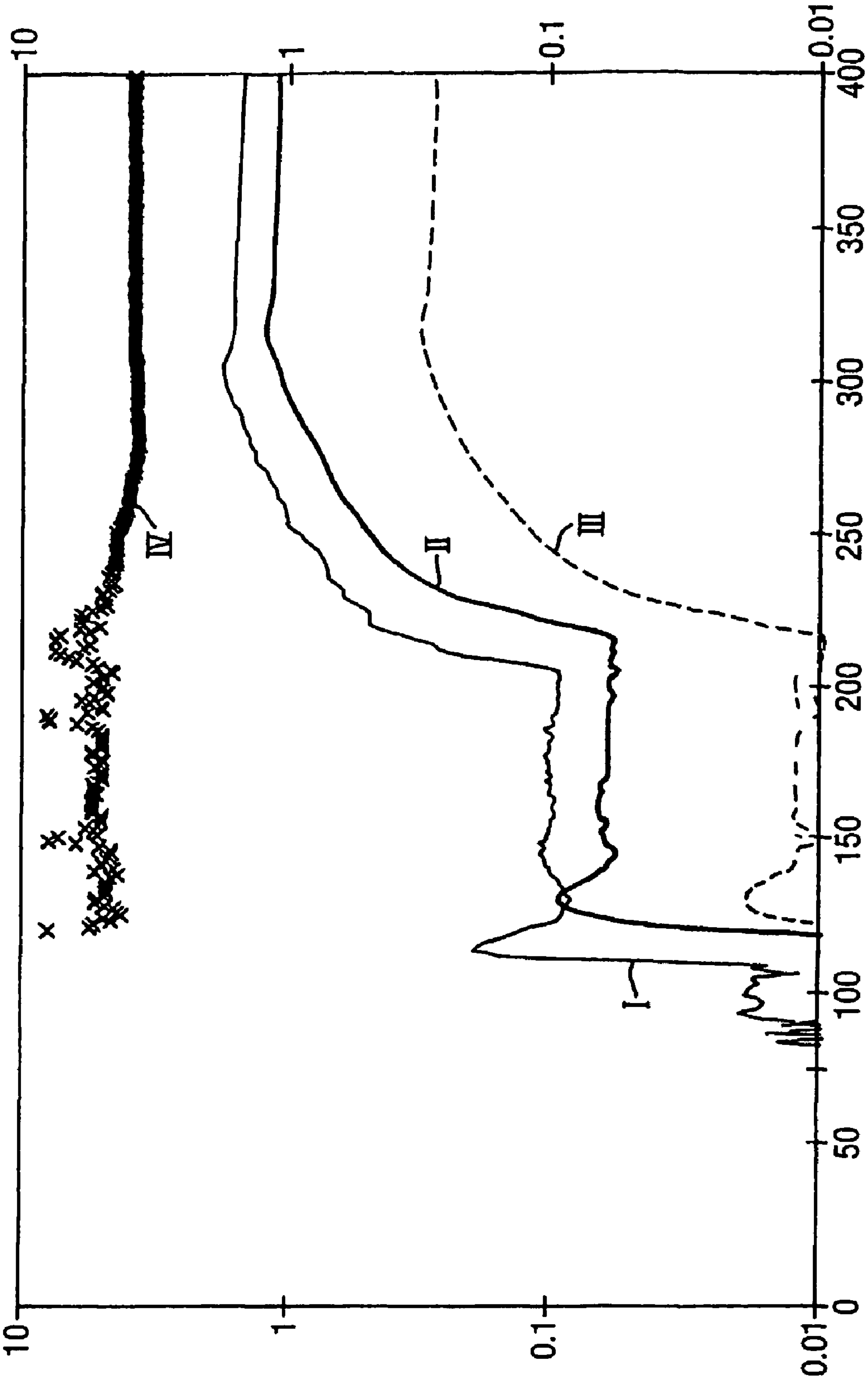
Figure 6:
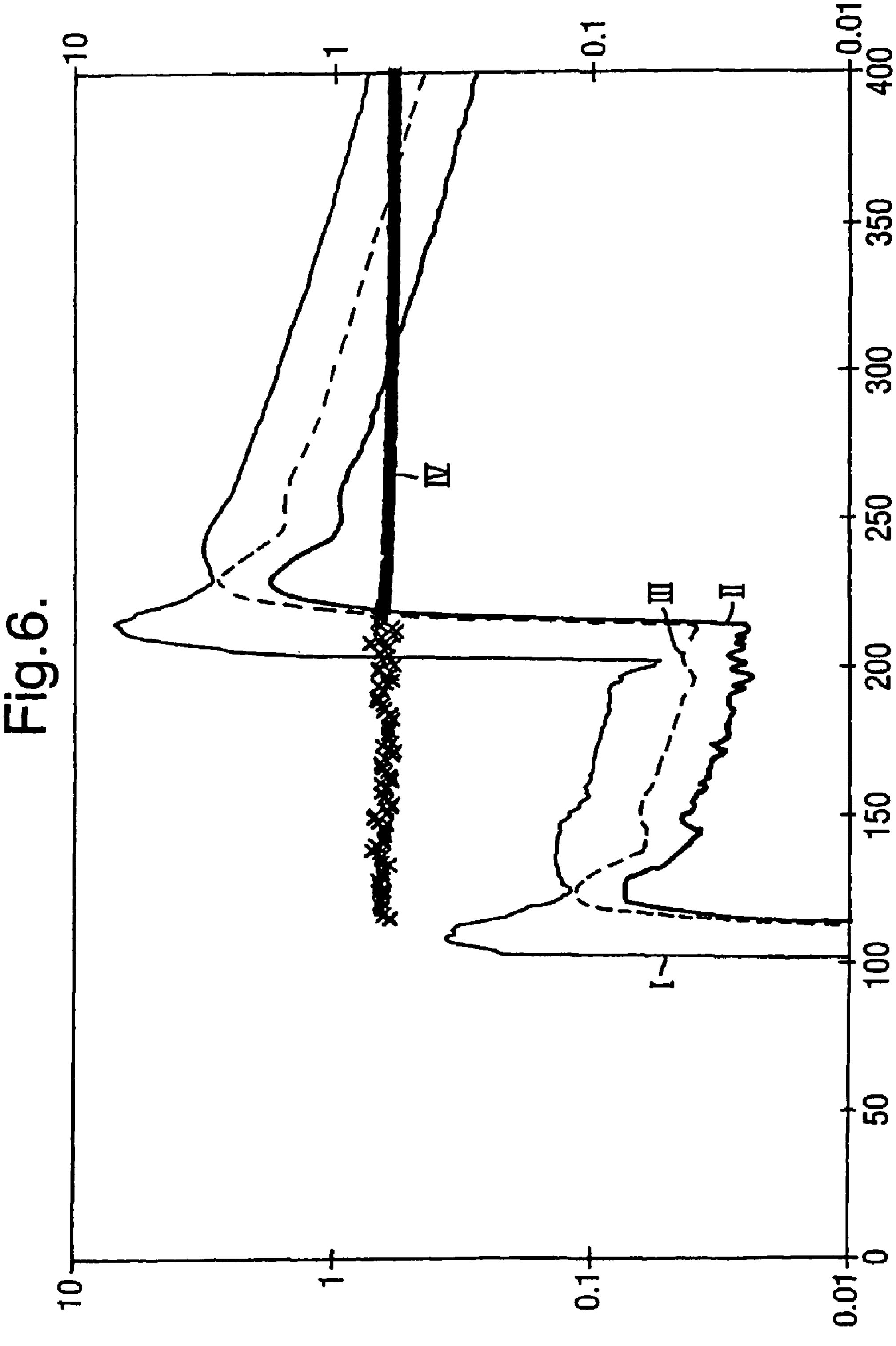

In a first, detecting, mode, the control system 16 drives the LEDs 3,3A continuously at different frequencies, and separate narrow band or lock-in amplifiers, forming part of the control system 16, respond to the output from the photodiode 15 and respectively energise the lines 21 and 23 with signals corresponding to the scattered blue light and the scattered infra-red radiation. The signals on lines 21 and 23 are fed to the comparison unit 25 which measures the ratio of the amplitude of the signal on line 21 to the amplitude of the signal on line 23. FIGS. 5 and 6 explain the operation of the apparatus in this mode.

In FIGS. 5 and 6, the horizontal axis represents time, the left hand vertical axis represents visible obscuration expressed as a percentage of light obscured per metre, and the right hand vertical axis represents the output of the detector 15 in FIG. 1. The left and right hand axis are to a logarithmic scale.

FIG. 5 shows results obtained when obscuration is caused by smoke (in this case, grey smoke produced by smouldering cotton), the smoke being released for 5 s at 100 s and then for 100 s between 200 and 300 s. In FIG. 6, the obscuration is caused by a non-smoke source, in this case by a hairspray aerosol. A one second spray is released at 100 s and a 10 s spray at 200 s.

In FIG. 5, curve I plots the obscuration. Curve II plots the output of the detector 15 in response to the blue light emitted by the source 3. Curve III plots the output of detector 15 in response to the infra-red radiation emitted by source 3A. It will be seen that the detector output in response to the scattered infra-red radiation (Curve III) is much less than the detector output in response to the scattered blue light (curve II). Curve IV shows the ratio of the detector output when the emitted radiation is blue light (curve II) to the output when the emitted radiation is infra-red (curve III). The ratio is significantly greater than one.

In FIG. 6, the curves I, II, III and IV have the same identities as in FIG. 5. It will be noted that the ratio shown by curve IV is significantly less than one.

Therefore, if the comparison unit 25 determines that the ratio which it measures is greater than a predetermined value, this indicates obscuration by smoke and the unit produces a warning signal on a line 30. If the measured ratio is less than one, however, this indicates non-smoke obscuration and no warning signal is produced. Therefore, by measuring the ratio of the signals produced in the detecting mode on the lines 21 and 23, very sensitive smoke detection is produce with very good discrimination against non-smoke obscurations. The warning signal output from the comparison unit 25 on line 30 is fed to an alarm unit 32 which also receives an output on a line 34 if the magnitude of the signal on line 21 (that is, the signal produced by the photodiode 15 in response to the received scattered blue light) exceeds a predetermined threshold fixed by threshold unit 29. If the alarm unit 32 receives signals on both lines 30 and 34, it produces an alarm output.

In accordance with a feature of the detector apparatus being described, however, it can also operate in a monitoring mode and, in fact, normally operates in this mode. In the monitoring mode, the control system 16 maintains the source 3 switched off or perhaps pulsing at a very slow rate. However, during this mode, the control system part 16 periodically energises the infra-red source 3A. The source 3A may be energised at significant intensity but for very short periods and at a very slow flashing rate—for example, of the order of once per second. Because only the source 3A is energised during the monitoring mode, and only for short periods at a relatively slow flashing rate, the power consumption in this mode is low. It is known that infra-red LEDs have a long lifetime when energised in this way.

During the monitoring mode, the control system 16 monitors the output from the detector 15. In the absence of any obscuration in the volume 9, there will of course be no such output. In the presence of any obscuration, however, some of the infra-red radiation will be scattered onto detector 15 and a corresponding output on line 18 will thus be produced. The control system 16 produces a corresponding signal on line 23 (using a suitable synchronous amplifier) and the magnitude of this signal is compared with a predetermined threshold in the threshold detector 28. If the predetermined threshold is exceeded, a signal on a line 36 causes the control system 16 to switch the apparatus into the detecting mode described above, in which both sources 3 and 3A are pulsed—at respectively different frequencies which are greater than the frequency of pulsing of the infra-red source 3A during the monitoring mode. As already explained, the comparison unit 25 now measures the ratio between the signals respectively produced on the lines 21 and 23 and thus the system now operates at very high sensitivity for detecting smoke particles and discriminating against non-smoke obscuration.

In this way, therefore, source 3 producing the blue light is only energised when the conditions are such that high sensitivity smoke detection and discrimination is required. Power consumption is thus minimised as is any adverse effect of the possibly lower lifetime of the blue-light-emitting LED 3.

During the monitoring mode, the rate at which the infra-red LED 3A is pulsed, and the threshold applied by threshold detector 28 which the output of the photodiode has to exceed in order to switch the system into the detecting mode, are set according to the perceived risk in the particular application of the apparatus. In order to maintain high sensitivity, this threshold would normally be set at a low level. However, in order to guard against false alarms, the control system could be set so that the output of the photodiode 15 must exceed this threshold for a predetermined number (e.g. two or more) of pulsed outputs from the infra-red LED 3A before the apparatus switches into the detecting mode.

When the apparatus has been switched into the detecting mode from the monitoring mode, it would normally be kept in the detecting mode either until the signal on line 21, corresponding to the scattered blue light received by the detector 15, has fallen below the predetermined threshold set by threshold detector 26 (and, preferably, has remained below that threshold for at least a predetermined time) or until the ratio measured by the comparison unit 25 has risen above a level at which an alarm output, indicative of a fire alert, is produced.

The apparatus could be arranged to switch back automatically to the monitoring mode when the ratio output of the comparison unit 25 falls below the alarm level. Instead, manual resetting could be necessary.

In certain circumstances, such as when there is a generally dirty environment within the volume 9, the apparatus may tend to switch repeatedly between the two modes. Thus, in the presence of a dirty but non-smoke environment in the volume 9, the apparatus will switch from the monitoring mode into the detecting mode but will then quickly switch back to the monitoring mode when the output of the comparison unit 25 indicates that the obscuration is non-smoke obscuration—and will tend to continue to repeat this switching action. In such circumstances, the control system 16 could be arranged automatically to increase the threshold of threshold unit 28 which the output of the detector 15 has to exceed in the monitoring mode before switching the detector into the detecting mode. Instead, the control system could be arranged in such circumstances to limit the time spent in the detecting mode.

The operation of the apparatus is further described with reference to FIGS. 7 and 8.

Figure 7A:
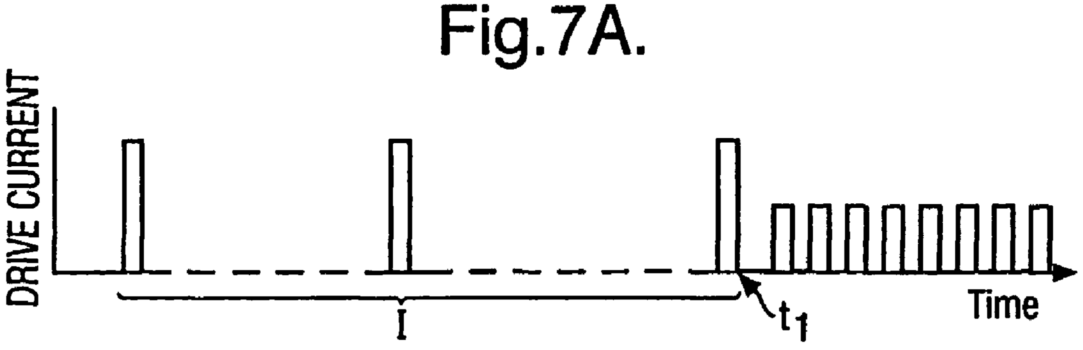
Figure 7B:
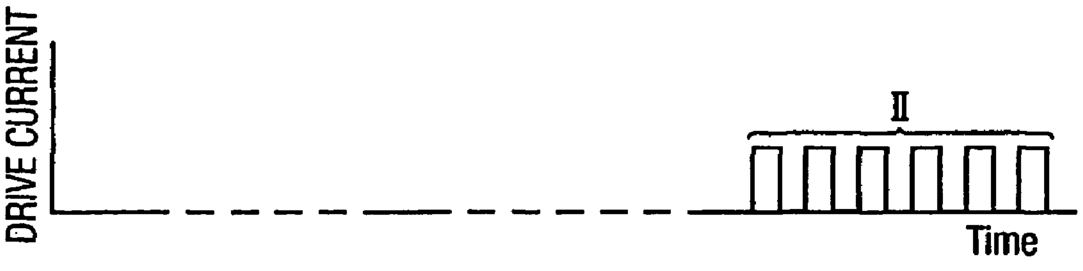

FIG. 7 is a graph the horizontal axis of which represents time and the vertical axis of which represents drive current through the LED 3 or the LED 3A. Thus, the plot A shows pulsing of the infra-red LED 3A. Over the time period I, the apparatus is operating in the monitoring mode in which the LED 3A is pulsed with relatively high current but infrequently. Over the period I, therefore, the blue LED 3 is not pulsed. At time $t_1$, it is assumed that the output of photodiode 15, in response to scattered infra-red radiation, reaches the predetermined threshold set by threshold unit 28 and the apparatus then switches into the detecting mode. Therefore, over the time period II, when the apparatus is in the detecting mode, the graph shows that the infra-red LED 3A is pulsed at a lower current amplitude but at a much higher frequency. Similarly, over the same time period (plot B), the blue LED 3 is now pulsed but at a different frequency from the infra-red LED 3A.

Figure 8:
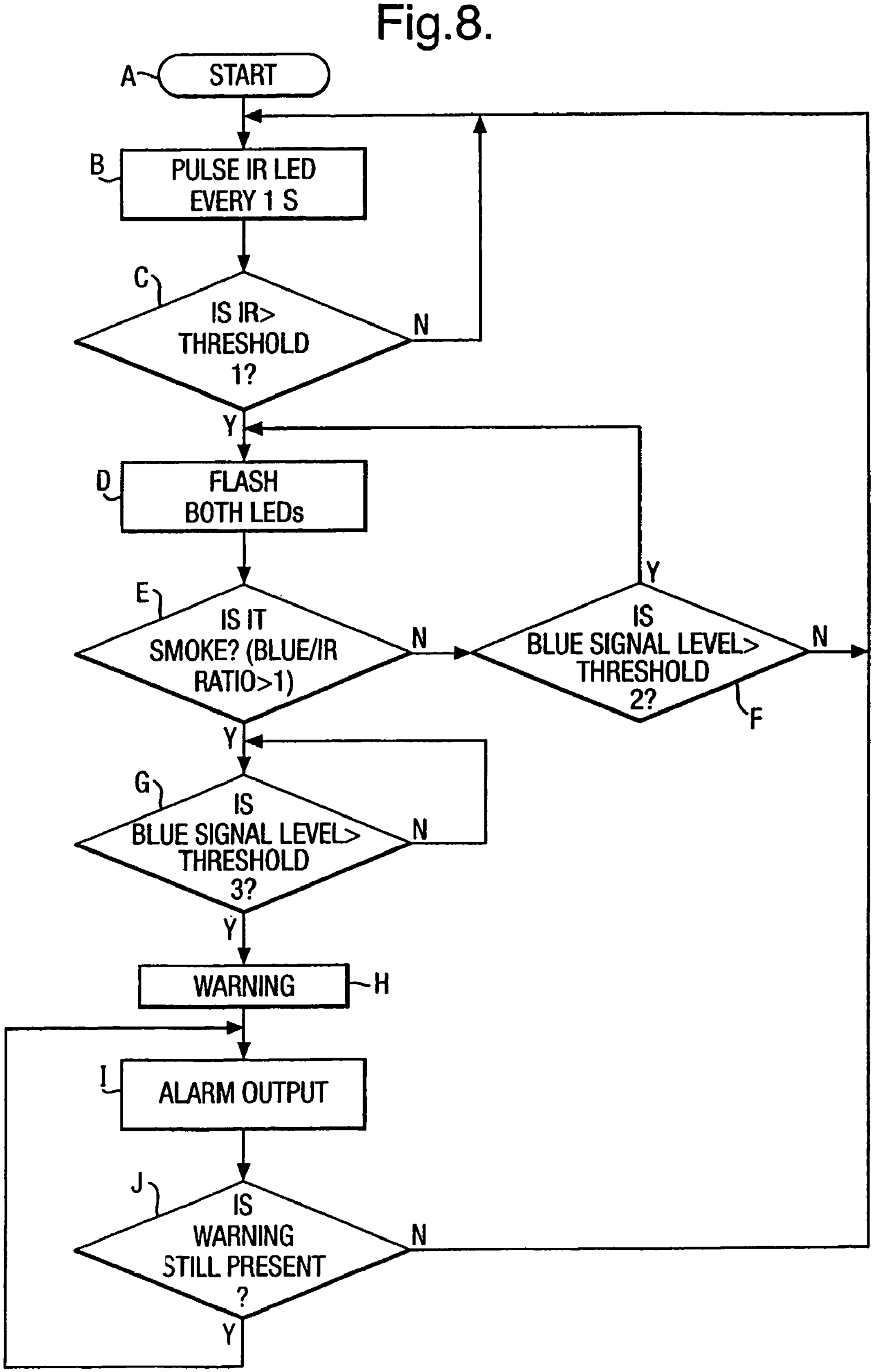
FIG. 8 is a flow chart for further explaining the operation of the apparatus of FIG. 1.

FIG. 8 is a flow chart showing the two modes of operation of the detector.

After start-up (step A), the apparatus initially operates in the monitoring mode, with the infra-red LED 3A being pulsed at a low rate (every second, say) (step B). The control system 16 checks whether the output of detector 15 in response to any received scattered infra-red radiation exceeds a first threshold (Threshold 1—the threshold applied by threshold unit 28) (step C). If this threshold is not exceeded, the apparatus remains in the monitoring mode. If, however, Threshold 1 is exceeded, then the apparatus enters the detecting mode (step D), and both the LEDs 3 and 3A are now pulsed, at the different frequencies.

In the manner explained, lock-in amplifiers in the control system 16 produce signals on the lines 21 and 23 corresponding to the detector output in response to the blue radiation from LED 3 and the infra-red radiation from LED 3A. The comparison unit 25 checks whether the ratio of the amplitude of the signal on line 21 to the amplitude of the signal on line 23 is greater than 1 (step E). If the ratio does not exceed 1, the control system 16 checks whether the signal amplitude on line 21 exceeds a second predetermined threshold (Threshold 2—the threshold applied by threshold unit 26) (step F). If Threshold 2 is exceeded, the apparatus remains in the detecting mode. If Threshold 2 is not exceeded, the apparatus reverts to the monitoring mode.

If in step E, the ratio measured by the comparison unit 25 is determined to be greater than 1, the apparatus checks (step G) whether the amplitude of the signal on line 21 exceeds the threshold (Threshold 3) applied by the threshold unit 29. If this threshold is not exceeded, no alarm output is produced. However, if Threshold 3 is exceeded, a warning is produced (step H). This signal causes the alarm unit 32 (FIG. 1) to produce a suitable alarm output (step I).

At step J, a check is made whether a warning signal is still being produced. If not, the detector reverts to the monitoring mode. If the warning signal is still produced, however, then the alarm output (step I) is maintained.

The infra-red radiation used in the apparatus does not need to be at 880 nm ($3.5\times10^{-5}$ in.).

In a modification, a dual LED arrangement may be used instead of the separate emitters 3,3A and the beam splitter 17 of FIG. 1.

In another modification, where very high sensitivity is not required, the ellipsoidal mirror 13 of FIG. 1 may be omitted and perhaps replaced by a labyrinth arrangement for collecting the scattered radiation.

The invention claimed is:

1. Particle detecting apparatus, comprising first and second radiation emitting means for respectively emitting first and second radiation along substantially the same predetermined path into a scattering volume when respectively rendered operative, radiation sensing means for receiving and sensing said first radiation forward-scattered from the scattering volume by the presence of particles therein and for receiving and sensing said second radiation forward-scattered from the scattering volume by the presence of particles therein, processing means responsive to the received and sensed first radiation to produce a first signal in dependence thereon and responsive to the received and sensed second radiation to produce a second signal in dependence thereon, output means for comparing the two signals whereby to produce a warning output when the comparison indicates that the particles are of a predetermined type but not when the comparison indicates otherwise, and control means operative when the first radiation emitting means is rendered operative to maintain the second radiation emitting means inoperative until the first signal has exceeded a predetermined value and for then rendering the second radiation emitting means operative.

2. Apparatus according to claim 1, in which the control means maintains the second radiation emitting means inoperative until the first signal has exceeded the predetermined value for at least a predetermined time and then renders it operative.

3. Apparatus according to claim 1, in which the control means maintains the second radiation emitting means inoperative by maintaining it de-energised.

4. Apparatus according to claim 1, in which the emission of the radiation from each radiation emitting means when rendered operative takes place intermittently at a predetermined frequency of emission.

5. Apparatus according to claim 4, in which the frequencies of emission of radiation of the first and second radiation emitting means when they are both rendered operative are predetermined first and second frequencies which are respectively different.

6. Apparatus according to claim 5, in which the processing means comprises means operative in dependence on the two different frequencies.

7. Apparatus according to claim 5, in which the frequency of intermittent emission of radiation by the first radiation emitting means while the second radiation emitting means is maintained inoperative is less than the first and second frequencies.

8. Apparatus according to claim 4, in which the control means comprises means operative to control the mark/space ratio at which the first radiation emitting means emits the first radiation to be lower when the second radiation emitting means is maintained inoperative than when the second radiation emitting means is rendered operative.

9. Apparatus according to claim 4, in which the control means comprises means operative to control the amplitude at which the first radiation emitting means emits the first radiation to be higher when the second radiation emitting means is maintained inoperative than when the second radiation emitting means is rendered operative.

10. Apparatus according to claim 1, in which the emission of the radiation from each radiation emitting means when rendered operative takes place intermittently at a predetermined frequency of emission, and in which the control means maintains the second radiation emitting means inoperative by controlling it to emit the radiation at a frequency of emission very much less than the predetermined frequency of emission.

11. Apparatus according to claim 1, including means for preventing the output means from producing the warning output until at least one of the first and second signals exceeds a predetermined value.

12. Apparatus according to claim 1, in which the first radiation is infra-red radiation.

13. Apparatus according to claim 12, in which the infrared radiation has a wavelength of about 880 nm.

14. Apparatus according to claim 1, in which the second radiation is blue light.

15. Apparatus according to claim 14, in which the second radiation has a wavelength between about 400 nm and about 500 nm.

16. Apparatus according to claim 1, including collecting means for collecting the first and second radiation forward-scattered at predetermined scattering angles from the scattering volume by the presence of the particles therein and for directing the collected first and second radiation to the radiation and sensing means for reception and sensing thereby.

17. Apparatus according to claim 16, in which the predetermined scattering angles lie in a range between about 10° and 35°.

18. Apparatus according to claim 16, in which the collecting means is an ellipsoidal mirror.

19. Apparatus according to claim 1, in which the radiation sensing means (15) comprises a photodiode.

20. Apparatus according to claim 1, in which the particles of the predetermined type are smoke particles.

21. Apparatus according to claim 20, in which the smoke particles have sizes of less than one micron.

22. Apparatus according to claim 1, including beam dump means positioned in the predetermined path and further from the radiation emitting means than the scattering volume.

23. A particle detecting method, comprising the steps of controllably allowing the respective emissions of first and second radiation along substantially the same predetermined path into a scattering volume, receiving and sensing said first radiation forward-scattered from the scattering volume by the presence of particles therein and receiving and sensing said second radiation forward-scattered from the scattering volume by the presence of particles therein, processing the received and sensed first radiation to produce a first signal in dependence thereon, processing the received and sensed second radiation to produce a second signal in dependence thereon, comparing the two signals whereby to produce a warning output when the comparison indicates that the particles are of a predetermined type but not when the comparison indicates otherwise, and, while the first radiation is allowed to be emitted, preventing emission of the second radiation until the first signal has exceeded a predetermined value and for then allowing emission of the second radiation.

24. A method according to claim 23, in which the step of preventing emission of the second radiation prevents such emission above a nominal value.

25. A method according to claim 24, including the step of preventing the production of the warning output until at least one of the first and second signals exceeds a predetermined value.

26. A method according to claim 24, in which the first radiation is infra-red radiation.

27. A method according to claim 26, in which the infra-red radiation has a wavelength of about 880 nm.

28. A method according to claim 23, in which the step of preventing emission of the second radiation prevents such emission until the first signal has exceeded the predetermined value for at least a predetermined time.

29. A method according to any one of claims 23, in which the emission of each radiation when allowed takes place intermittently at a predetermined frequency of emission.

30. A method according to claim 29, in which the frequencies of emission of the first and second radiations when allowed are predetermined first and second frequencies which are respectively different.

31. A method according to claim 30, in which the processing steps are operative in dependence on the two different frequencies.

32. A method according to claim 30, in which the frequency of intermittent emission of the first radiation while emission of the second radiation is prevented is less than the first and second frequencies.

33. A method according to claim 29, in which the first radiation is emitted intermittently at a mark/space ratio which is lower when emission of the second radiation is prevented than when emission of the second radiation is allowed.

34. A method according to claim 29, in which the amplitude at which the first radiation is emitted is higher when emission of the second radiation is prevented than when emission of the second radiation is allowed.

35. A method according to claim 23, in which the second radiation is blue light.

36. A method according to claim 35, in which the second radiation has a wavelength between about 400 nm and about 500 nm.

37. A method according to claim 23, including the step of collecting the first and second radiation forward-scattered at predetermined scattering angles from the scattering volume by the presence of the particles therein and directing the collected first and second radiation for reception and sensing.

38. A method according to claim 37, in which the predetermined scattering angles lie in a range between about 10° and 35°.

39. A method according to claim 23, in which the particles of the predetermined type are smoke particles.

40. A method according to claim 39, in which the smoke particles have sizes of less than one micron.

* * * * *

UNITED STATES PATENT AND TRADEMARK OFFICE

CERTIFICATE OF CORRECTION

PATENT NO. : 7,084,401 B2 
APPLICATION NO. : 10/432739
DATED : August 1, 2006
INVENTOR(S) : Bell et al.

It is certified that error appears in the above-identified patent and that said Letters Patent is hereby corrected as shown below:

Title Page
Page 2, Foreign Patent Documents: “WO WO 99/38599 A1 08/1999” should read --WO WO 99/38573 08/1999--

Col. 3, lines 1-2: “about 100 and 350).” should read --about 10° and 35°).--

Col. 3, line 26: “1.6-2.0x$10^{31\ 5}$ in.)” should read --1.6-2.0x$10^{-5}$ in.)--

Signed and Sealed this

Sixth Day of February, 2007

JON W. DUDAS
*Director of the United States Patent and Trademark Office*